Feb. 19, 1929.  
L. A. MULLIGAN  
1,702,793  
WINDSHIELD ADJUSTING DEVICE  
Filed Dec. 30, 1927   2 Sheets-Sheet 1

Inventor  
Leonard A. Mulligan  
By  
Attorney

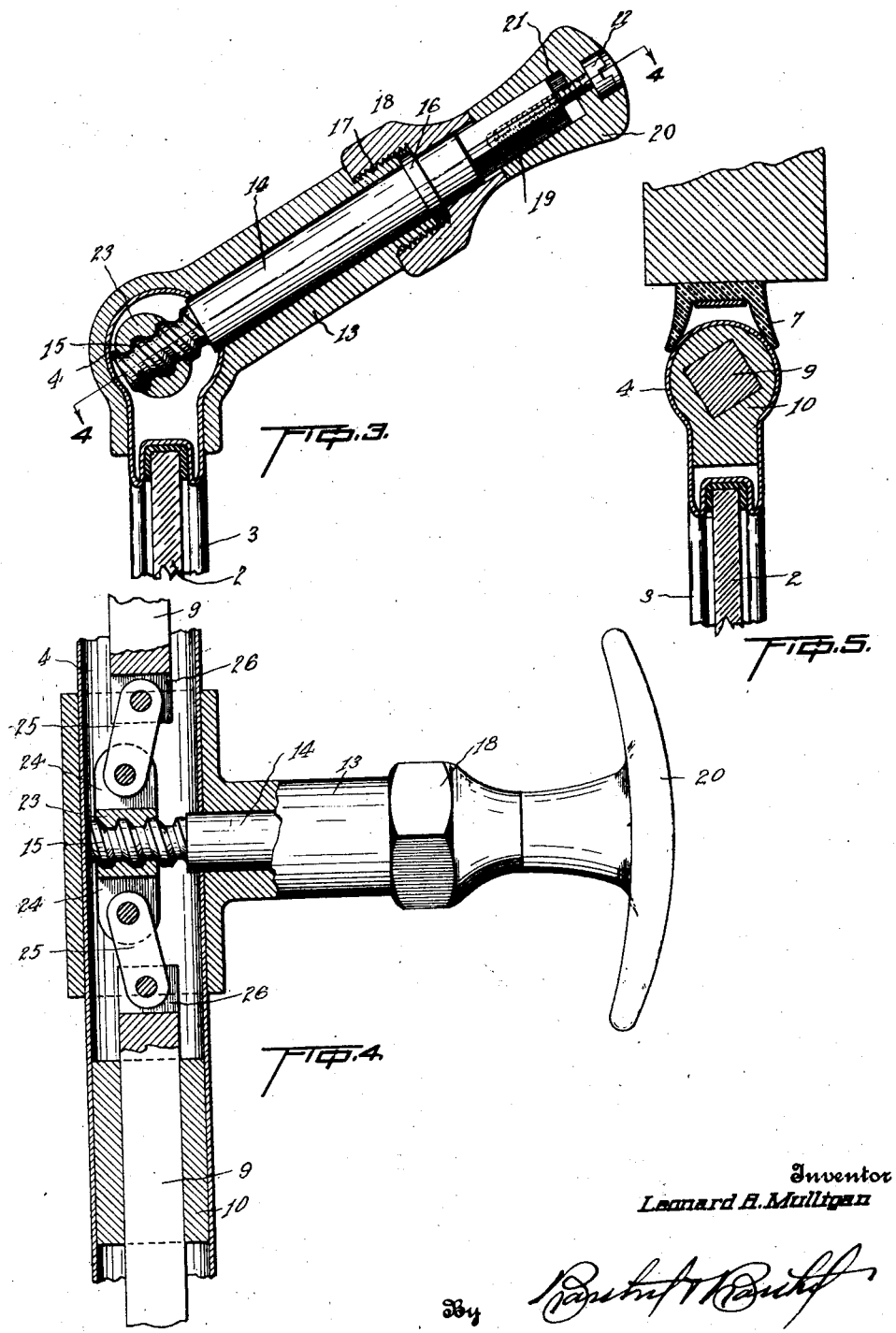

Patented Feb. 19, 1929.

1,702,793

UNITED STATES PATENT OFFICE.

LEONARD A. MULLIGAN, OF DETROIT, MICHIGAN, ASSIGNOR TO JOSEPH N. SMITH & COMPANY, OF DETROIT, MICHIGAN, A CORPORATION OF MICHIGAN.

WINDSHIELD-ADJUSTING DEVICE.

Application filed December 30, 1927. Serial No. 243,561.

The present invention pertains to a novel windshield adjusting device designed particularly for use on motor vehicles.

The principal object of the invention is to provide a device of this character whereby it is possible to adjust the position of the windshield by the use of only one hand. The windshield is supported by locking members extending therefrom into the frame or body of the vehicle. These locking members are of conical formation and are received in conically recessed brackets in the body frame. The locking members are however carried on the outer ends of a pair of shafts slidably mounted in the windshield frame. The shafts are connected by a toggle mechanism operable by a suitable handle also mounted on the frame. The operation of the handle permits the conical locking members to be rotatably received in the brackets or to be tightly wedged therein as desired. In adjusting the angle of the windshield, the locking members are loosened in their brackets, whereupon the windshield is turned to the desired angle, and the handle is then operated to lock the members in their brackets, as a result of which the desired position of the windshield is maintained.

The invention is fully disclosed by way of example in the following description and in the accompanying drawings, in which—

Fig. 4 is a section on the line 4—4 of Figure 3;

Fig. 5 is a section on the line 5—5 of Figure 2; and

Fig. 6 is a detail longitudinal section of one of the brackets.

Reference to these views will now be made by use of like characters which are employed to designate corresponding parts thoughout.

Figure 1:
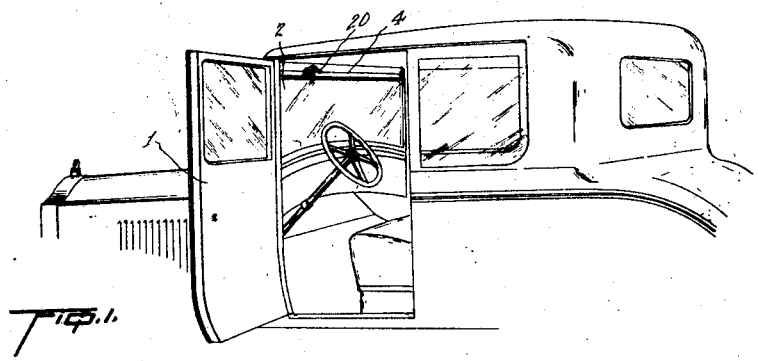
Figure 1 is a perspective view showing the invention installed.

In Figure 1 is illustrated a motor vehicle 1 provided with a windshield 2 installed according to this invention. The windshield includes a surrounding frame 3, the upper edge 4 of which is tubular or hollow as may be seen by reference to Figures 3, 4, 5 and 6. The body 5 of the vehicle is provided with a pair of brackets 6 fixed therein at points adjacent the ends of the side 4. To the upper edge of the windshield opening is secured a sealing strip 7 engaging the tube 4 as shown in Figures 5 and 6. The brackets are preferably made of brass and are formed each with a ground conical opening 8 having its larger end presented to the windshield opening.

Figure 2:
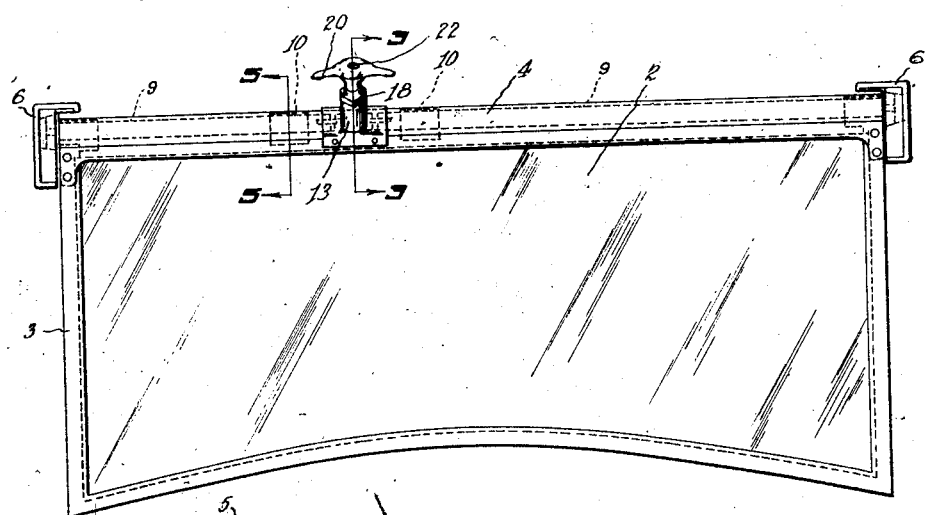
Fig. 2 is an elevation of a windshield equipped with the device of the invention.
Figure 3:
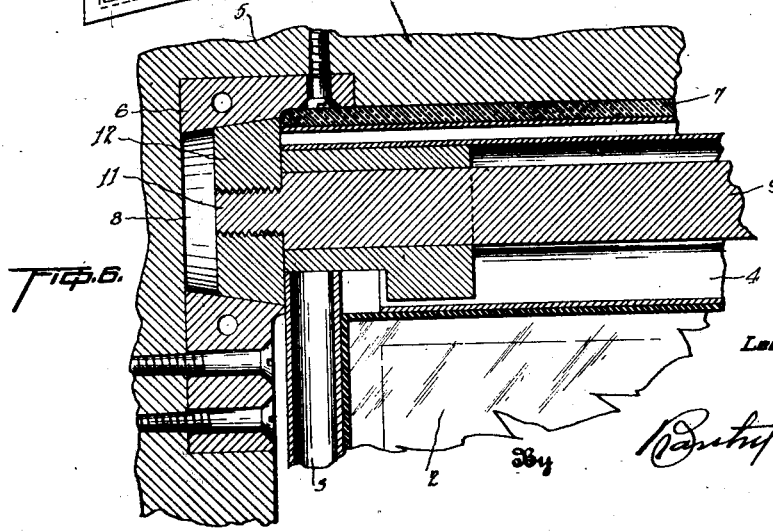
Fig. 3 is a section on the line 3—3 of Figure 2.

The tube 4 contains a pair of aligned square shafts 9 extending to the ends thereof and slidably supported in bushings 10 fitted in the tube. One of these shafts is shorter than the other, and the space between the inner ends thereof occurs somewhat to the left of the center line in order to be within reach of the driver's seat as shown in Figures 1 and 2. Each such shaft has a reduced and threaded extension 11 at its outer end projecting out of the tube 4 and fitted with a steel conical locking member 12. This member is receivable in the corresponding conical recess 8 and may be locked therein by the operation presently to be described.

To the tube 4 is fixedly secured a lever member 13 at the space between the inner ends of the shafts 9. A stem 14 is rotatably mounted in the lever, axially thereof, and is formed at one end with a screw 15 which is disposed in the tube 4 and in the space between the inner ends of the shafts 9. The stem is held against axial shifting by a collar 16 engaged at one side by an extension 17 of the lever 13, and at the other side by a nut 18 threaded over the bushing. The outer end of the lever extends beyond the nut 18 and is squared as at 19. Over this extension is fitted a handle 20, having a corresponding square socket 21 and secured thereto by a screw 22.

On the screw portion 15 of the stem is threaded a nut 23 having slotted or bifurcated ends 24. These ends receive toggle links 25 pivotally attached therein and also pivotally mounted in the bifurcated inner ends 26 of the shafts 9.

When the links 25 are brought into strict parallelism with the tube 4, the toggle mechanism is expanded, and the locking members 12 are forced tightly into their sockets 8, so that the windshield 2 is secured against changing its position. When it is desired to change the position of the windshield, the handle 20 is turned to bring the nut 23 downwardly on the screw 15. The toggle mechanism is now contracted, as shown in Figure 4, whereupon the locking members 12 are released in their sockets. The windshield may now be tilted by means of the lever 13, using the member 20 as a handle without turning the same on its axis. When the windshield has been brought to the desired position, the handle is turned on its axis to return the nut 23 to the position shown in Figure 4, whereupon the locking elements 12 are again fixed against rotation in their brackets.

Although a specific embodiment of the invention has been illustrated and described, it will be understood that various alterations in the details of construction may be made without departing from the scope of the invention as indicated by the appended claims.

What I claim is:—

1. In combination with a framed windshield and support therefor, a pair of shafts slidable in the frame and through the ends thereof, toggle mechanism connecting the inner ends of said shafts, locking members carried by the outer ends of the shafts, complementary locking members carried by said support and adapted to co-operate with said first named locking members, and an operating screw threaded into an element of said toggle mechanism for expanding and contracting said mechanism.

2. In combination with a framed windshield and support therefor, a pair of shafts slidable in the frame and through the ends thereof, toggle mechanism connecting the inner ends of said shafts, conical locking members carried by the outer ends of the shafts, brackets mounted in the support and having conical recesses adapted to receive said locking members, a lever secured to the frame between said shafts, and a screw rotatably mounted in said lever and threaded into an element of said toggle mechanism for expanding and contracting said mechanism.

3. In combination with a framed windshield and support therefor, a pair of shafts slidable in said frame and through the ends thereof, locking members carried by the outer ends of said shafts, brackets mounted in said support and having conical recesses adapted to receive said locking elements, a lever mounted on said frame, a screw rotatably mounted in said lever, a nut disposed in the frame and threaded on said screw, said nut being disposed between the inner ends of said shafts, and links connecting said nut to said ends.

In testimony whereof I affix my signature.

LEONARD A. MULLIGAN.